(12) United States Patent
Ieda et al.

(10) Patent No.: US 7,333,021 B2
(45) Date of Patent: Feb. 19, 2008

(54) OPENING/CLOSING APPARATUS FOR VEHICLE DOOR

(75) Inventors: Kiyokazu Ieda, Chiryu (JP); Takeshi Ito, Chiryu (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 154 days.

(21) Appl. No.: 11/165,041

(22) Filed: Jun. 24, 2005

(65) Prior Publication Data

US 2005/0285717 A1    Dec. 29, 2005

(30) Foreign Application Priority Data

Jun. 24, 2004    (JP)    ............... 2004-186429

(51) Int. Cl.
G05B 19/00    (2006.01)
G08B 21/00    (2006.01)
E05B 17/10    (2006.01)
B60Q 1/00    (2006.01)
G06F 7/00    (2006.01)

(52) U.S. Cl. ............ 340/641; 340/5.61; 340/5.72; 340/425.5; 340/426.28; 340/545.1; 340/686.6; 362/100; 362/276; 362/501; 701/36; 701/49

(58) Field of Classification Search ............ 340/5.61, 340/5.72, 425.5, 545.1, 686.6, 426.28, 641; 362/501, 100, 276; 701/49, 36, 276
See application file for complete search history.

(56) References Cited

U.S. PATENT DOCUMENTS

| | | | |
|---|---|---|---|
| 6,070,998 A * | 6/2000 | Jennings et al. | ............ 362/501 |
| 6,550,946 B2 * | 4/2003 | Misawa et al. | ............ 362/501 |
| 6,648,493 B2 | 11/2003 | Klein | |
| 6,848,818 B2 * | 2/2005 | Huizenga | ............ 362/501 |
| 6,949,882 B2 * | 9/2005 | Suyama et al. | ............ 315/77 |
| 7,049,940 B2 * | 5/2006 | Ieda et al. | ............ 340/425.5 |
| 7,055,997 B2 * | 6/2006 | Baek | ............ 362/501 |
| 7,057,124 B2 | 6/2006 | Ieda et al. | |
| 7,065,439 B2 * | 6/2006 | Sakakura | ............ 701/49 |

(Continued)

FOREIGN PATENT DOCUMENTS

DE    198 22 733 C2    11/1999

(Continued)

OTHER PUBLICATIONS

European Office Action dated Jul. 30, 2007.

Primary Examiner—Benjamin C. Lee
Assistant Examiner—Lam Pham
(74) Attorney, Agent, or Firm—Sughrue Mion, PLLC (57) ABSTRACT

An opening/closing apparatus for a vehicle door includes: a door handle secured to an outer surface of the vehicle door, the door handle being manipulated by a user for opening and closing the vehicle door; an operation detecting portion for checking whether the door handle is manipulated to open or close the vehicle door, the operation detecting portion being provided in the door handle; a controller establishing locking and unlocking conditions of the vehicle door on the basis of user's intensions; and a light emitting device provided in the door handle, the light emitting device being driven by the controller to emit light beams to and away from the outer surface of the vehicle door depending on the respective conditions of the vehicle door.

17 Claims, 7 Drawing Sheets

U.S. PATENT DOCUMENTS

| | | |
|---|---|---|
| 7,106,172 B2 * | 9/2006 | Neveux et al. ............ 340/5.72 |
| 2004/0075531 A1 | 4/2004 | Ieda et al. |
| 2004/0104815 A1 | 6/2004 | Suyama et al. |
| 2004/0223336 A1 * | 11/2004 | Murakami et al. .......... 362/501 |
| 2004/0233677 A1 * | 11/2004 | Su et al. .................... 362/501 |

FOREIGN PATENT DOCUMENTS

| | | |
|---|---|---|
| EP | 1 760 227 A1 | 3/2007 |
| JP | 2000-045593 | 2/2000 |

* cited by examiner

OPENING/CLOSING APPARATUS FOR VEHICLE DOOR

CROSS-REFERENCE TO RELATED APPLICATION

The present application is based on and claims priority under 35 U.S.C. § 119 to Japanese Patent Application Number 2004-186429, filed on Jun. 24, 2004, the entire content of which is incorporated herein by reference.

FIELD OF THE INVENTION

The present invention is directed to an opening/closing apparatus for a vehicle door, the apparatus including a controller to establish a locked condition or an unlocked condition of the vehicle door by recognizing whether a user's intension is to open or close the vehicle door.

A well known locking system that is sometimes referred as smart entry system recognizes whether a user's intension is to open or close a vehicle door depending on the user's approach or getting off the vehicle, thereby establishing a locked condition or an unlocked condition of the vehicle door. However, unless the current condition of the vehicle door—locked or unlocked—is known to the user, the user is forced to check for the current condition of the vehicle door, causing diminishing the merits or advantages of this system.

For an easy indication of the vehicle door condition to the user, there has been provided a device as disclosed in Japanese Patent Publication No. 2000-45593. This device operates as follows: When a door locking device is indicated to operate by a transmitter held by a user who is apart from a vehicle, the brightness of the periphery of the vehicle is measured and the resulting brightness reaches a predetermined value, a buzzer is forced to ring in large sound volume. Subsequently, the door locking device causes the door to lock. If the value of the detected brightness is between specific values, in addition to the buzzer ringing, lighting an in vehicle compartment dome lamp is employed.

However, if the environment of the vehicle is noisy and dark when, say, in night, it is very difficult for the user to recognize the buzzer-sound and the lit dome lamp, which causes the merits or advantages of the device to diminish.

Thus, a need exists to provide an opening/closing apparatus for a vehicle door that is free from the above-described drawbacks.

SUMMARY OF THE INVENTION

An aspect of the present invention is to provide an opening/closing apparatus for a vehicle door comprising:
a door handle secured to an outer surface of the vehicle door, the door handle being manipulated by a user for opening and closing the vehicle door;
an unlocking condition detecting portion for checking whether or not the door handle is manipulated by the user to open the vehicle door, the unlocking condition detecting portion being provided in the door handle so as to be opposite to the outer surface of the vehicle door;
a first light-emitting portion provided in the door handle and emitting a light beam to the outer surface of the vehicle door; and
a controller establishing a wireless communication with a mobile system held by the user to recognize the user, the controller causing the first light-emitting portion to emit the light beam when the user is recognized to be in approaching the vehicle, the controller bringing the vehicle door from its locked condition to unlocked condition when the unlocking condition detecting portion is indicative of the user's manipulation of the door handle to open the vehicle door.

Another aspect of the present invention is to provide an opening/closing apparatus for a vehicle door comprising:
a door handle secured to an outer surface of the vehicle door, the door handle being manipulated by a user for opening and closing the vehicle door;
an operation detecting portion for checking whether the door handle is manipulated to open or close the vehicle door, the operation detecting portion being provided in the door handle;
a controller establishing locking and unlocking conditions of the vehicle door on the basis of user's intensions; and
a light emitting device provided in the door handle, the light emitting device being driven by the controller to emit light beams to and away from the outer surface of the vehicle door depending on the respective conditions of the vehicle door.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Hereinafter, with reference to attached drawings, an opening/closing apparatus for vehicle doors, when applied to a smart system, according to an embodiment of the present invention will be detailed in great detail.

[System Configuration]

Figure 1:
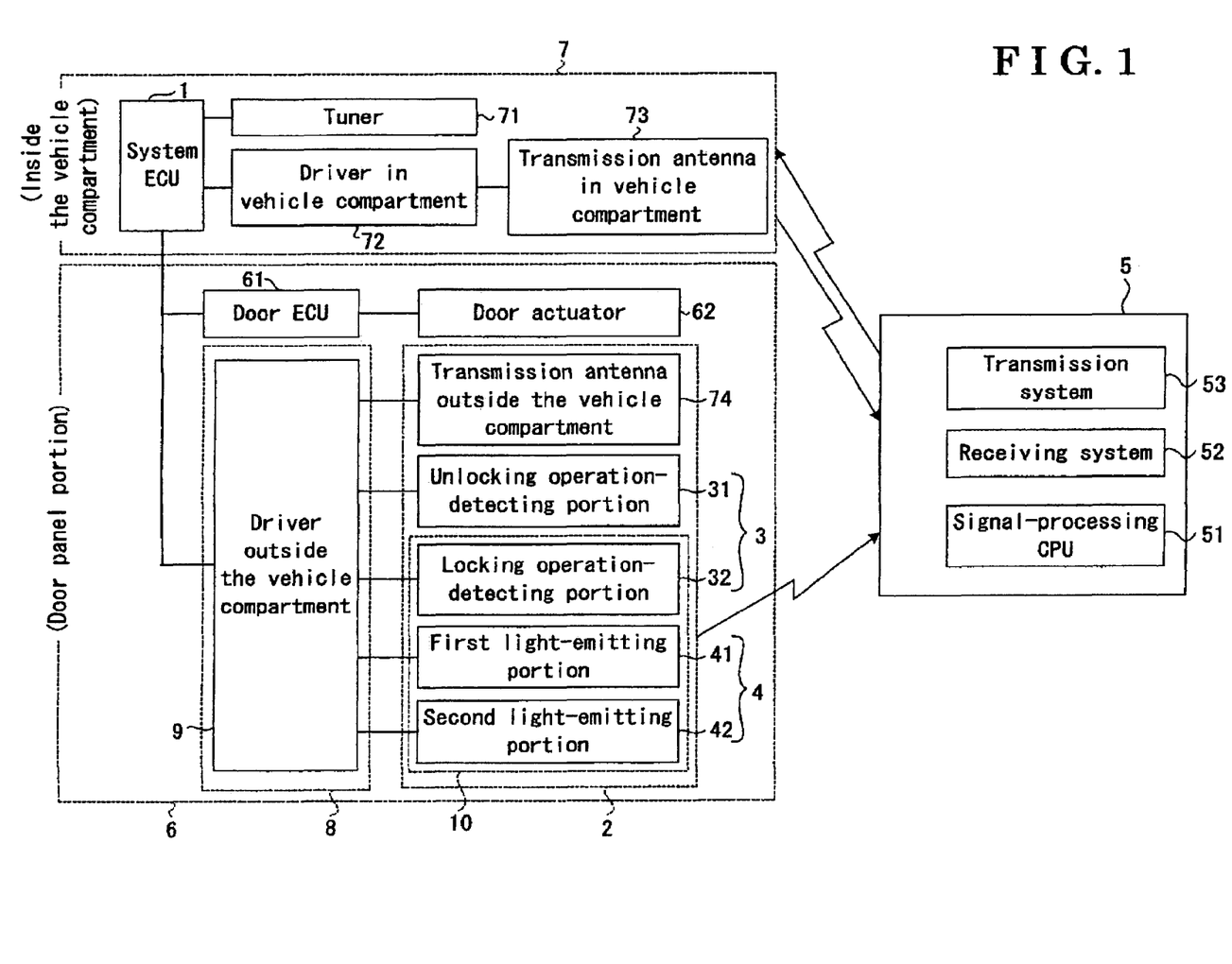
FIG. 1 illustrates a block diagram of a control system of an opening/closing apparatus for a vehicle door in accordance with an embodiment of the present invention.
Figure 2:
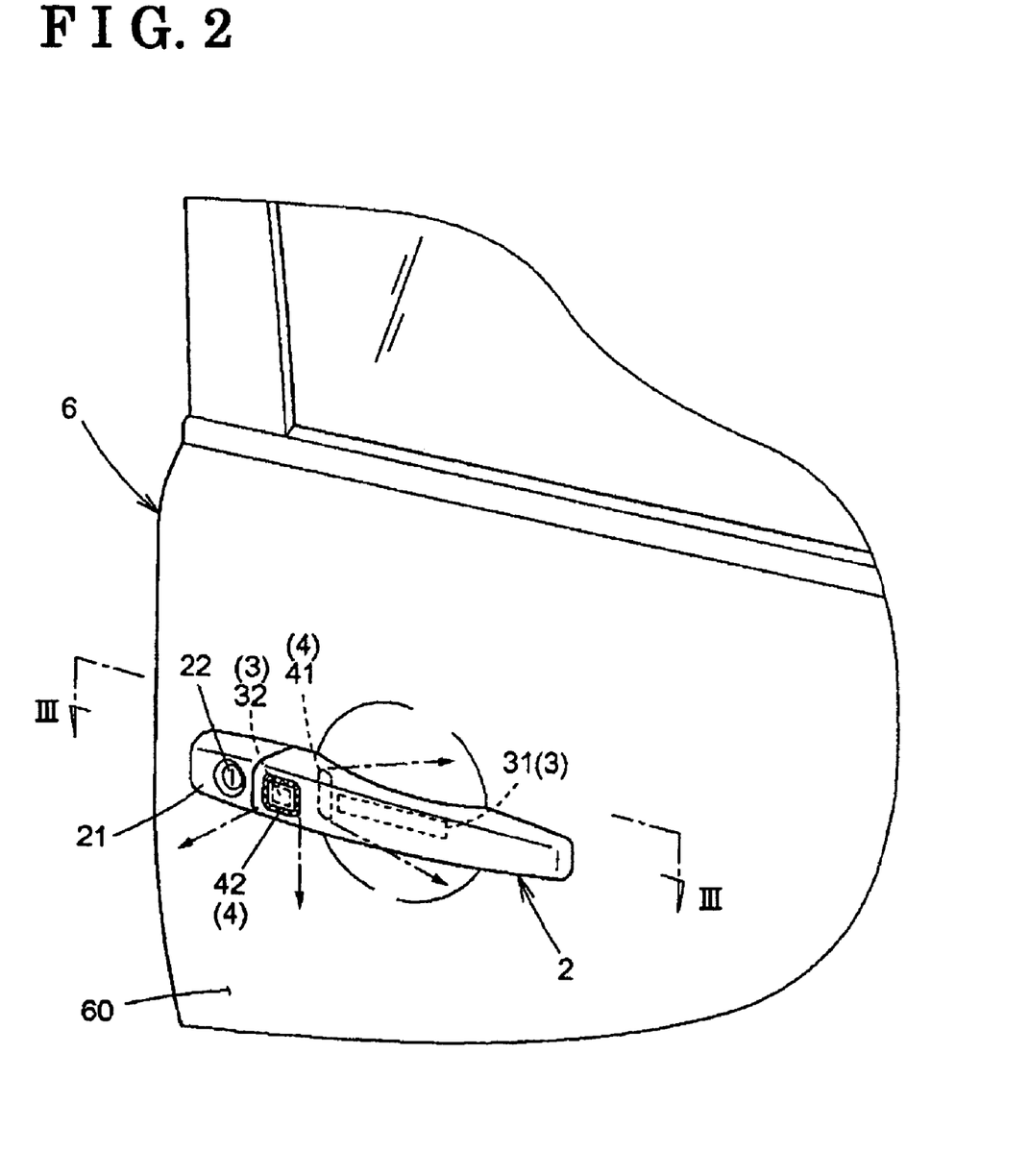
FIG. 2 is a partial perspective view of a vehicle door to which the opening/closing apparatus is applied.

First of all, referring to FIGS. 1 and 2, there is depicted an overall structure of a smart system mounted on a vehicle V. This smart system recognizes a user having a mobile system or handy device 5 is going to approach and has gotten off the vehicle V and then controls automatically a vehicle door 6 of the vehicle V to open and close, respectively. For example, when such a user having the mobile system 5 is approaching the vehicle V, the smart system recognizes such an approach, understands the user's intention to open the door 6 when the user grasps a door handle 2 secured to an outer side of the door 6, and controls the door 6 to open automatically.

The mobile system or portable device 5 that moves with the user includes, as illustrated in FIG. 1, a receiving system 52, a transmission system 53, and a signal processing CPU 51. The receiving system 52 has an antenna for receiving electromagnetic waves from the on-vehicle smart system, a tuner, and other components. The transmission system 53 has an antenna fro transmitting electromagnetic waves to the on-vehicle smart system, a modulating circuit, and other components. The signal processing CPU 51 serves for controlling the above transmission and receiving, for understanding the received signals, for generating signals to be transmitted, and for other processing purposes.

At a specific portion in a vehicle compartment VC, there are provided a system ECU (Electronic Control Unit) 1 as a total governor of the smart system, a tuner 71 for receiving the signal transmitted from the mobile system 5, an in-vehicle-compartment transmission antenna 73, and an in-vehicle-compartment driver 72 by which the signal to be transmitted via the transmission antenna 73 is processed in the form of modulation, amplification, and otherwise. The tuner 71, the in-vehicle-compartment transmission antenna 73, and the in-vehicle-compartment driver 72, as a whole, constitute a communication means. The ECU 1 has a recognizing means that is capable of recognizing whether the mobile system 5 approaches or moves away from the vehicle V by mutual communications between the ECU 1 and the mobile system or portable device 5.

As shown in FIG. 2, the vehicle door 6 has a door panel or outer surface portion 60 to which a door-handle 2 is provided, as an operation means, for opening and closing the door 6. The door-handle 2 is fixed to the door 6 by a handle frame 8 (cf. FIG. 3) accommodated in the door panel 60.

As shown in FIG. 1, the door-handle 2 secured to the door 6 includes an outer-vehicle transmission antenna 74 for transmitting the signal to mobile system or portable device 5, an operation detecting device 3 for detecting whether the user locks or unlocks the door 6, and a light emitting device 4 for visually indicating whether the door 6 is in locked condition or unlocked condition. Inside the hand frame 8 which serves for fixing the door-handle 2 to the door 6, there is provided an outer-vehicle-compartment driver 9 which establishes a signal communication between the system ECU 1 and each of the portions 74, 3, and 4 accommodated in the door handle frame 8. In addition, within the door panel portion 60 of the door 6, there are provided a door actuator 62 and a door ECU 61. The door actuator 62 brings the door 6 in either of locked and unlocked conditions by manipulating a well-known door lock mechanism. The door ECU 61 and the outer-vehicle-compartment driver 9 are the control of the system ECU 1.

In the present embodiment, the operation detecting device 3 is divided into two portions: unlocking operation detecting portion 31 and locking operation detecting portion 32. The unlocking operation detecting portion 31 is for detect whether or not the user has an intension to unlock the door 6, while the locking operation detecting portion 32 is for detect whether or not the use has an intension to lock the door 6. The light-emitting device 4 has a first light-emitting portion 41 and a second light-emitting portion 42 so that from the door handle 2 light beams emitted in different direction. For example, as shown in FIG. 2, the light beam from the first light-emitting portion 41 is emitted toward the outer surface 60 of the door 6 via a space between the door-handle 2 and the outer surface 6, while the light beam from the second light-emitting portion 42 is emitted in a direction away from the door 4.

[Configuration of Each Portion]

Figure 3:
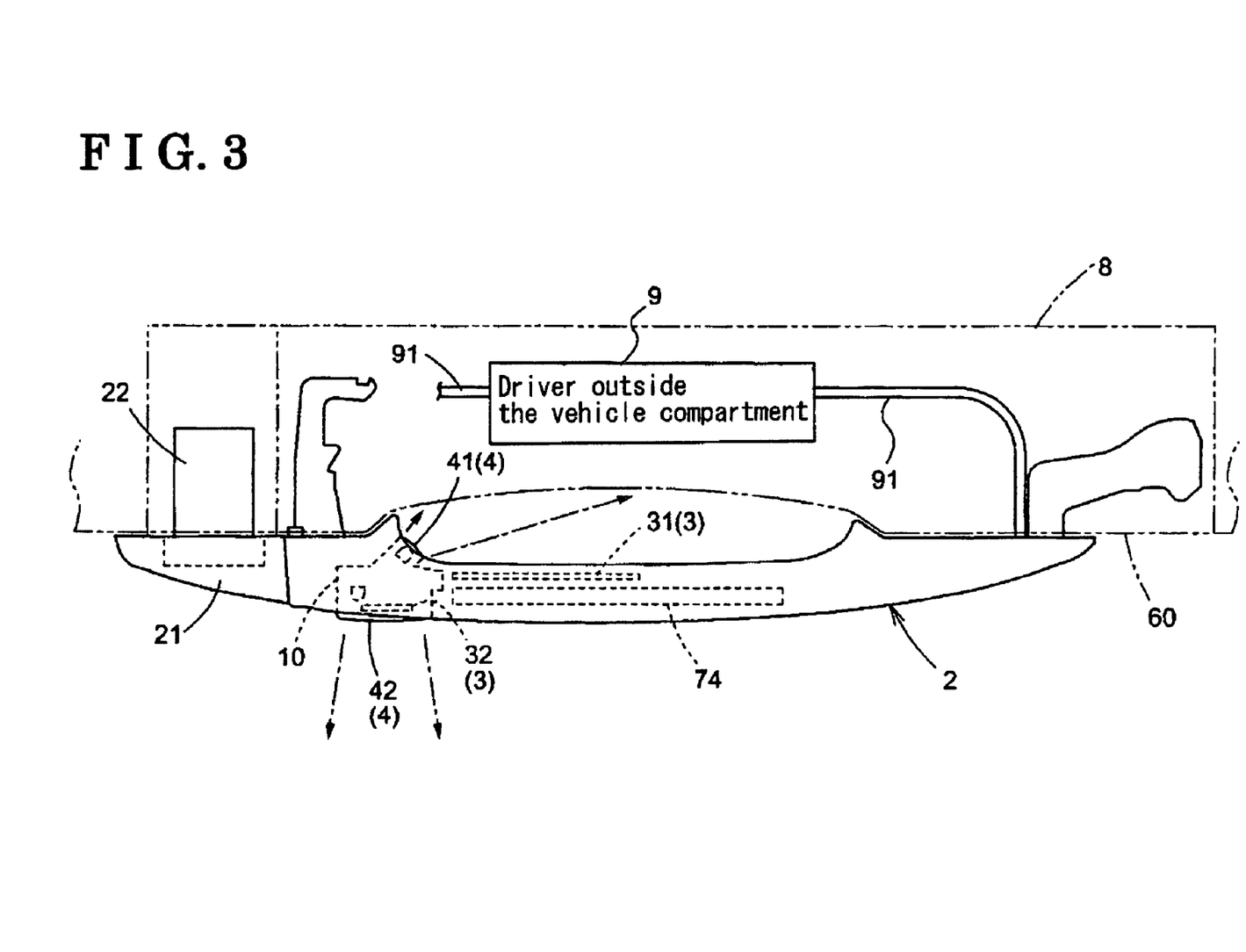
FIG. 3 is a cross-sectional view taken along line III-III in FIG. 2.

Referring now to FIG. 3 which is a cross-sectional view of the door-handle 2 taken along line III-III in FIG. 2, the door-handle 2 is fixed or secured to the door panel 60 in such manner that the door-handle 2 is secured to the hand frame 8 housed in the door panel 60 to hold the door panel 60 therebetween. The hand frame 8 holds therein a handle cap 21 that is provided with key cylinder 22. The key cylinder 22 is used to lock and unlock the door 6 in manually operated mechanical mode. The outer-vehicle-compartment driver 9 placed in the handle frame 8 is connected, via a wire harness 91, to each of the portions in the door-handle 2 and the system ECU 1 in the vehicle compartment VC.

As previously described, inside the door-handle 2, there are provided the outer-vehicle transmission antenna 74, the operation detecting device 3, and the light emitting device 4. As best seen in FIG. 3, the outer-vehicle transmission antenna 74 is placed in a center portion of the door handle 2. In the present embodiment, as the outer-vehicle transmission antenna 74, a ferrite-used loop antenna is employed. Instead of this, any other types of antennas are available so long as these antennas are capable of being housed in the door-handle 2.

In an outer side of the door-handle 2 which is not in opposition to the door panel 60 of the door 6, there is provided the locking operation detecting portion 32, while in an inner side of the door-handle 2 which is in opposition to the door panel 6 of the door 6, there is provided the unlocking operation detecting portion 32. When the user wants to open the door 6, the use grasps the door-handle 2 and then pulls the door-handle 2. For recognizing such a contact of the user's fingers with the door-handle 2, the unlocking operation detecting portion 32 is located at the inner side of the door-handle 2. The location of the locking operation detecting portion 32 is selected to the outer side of the door-handle 2 in light of the fact that the user's intention to lock the door 6 can be recognized when the user pushes or contacts the door-handle 2 with his/her fingers after his/her closing operation of the door 6 subsequent to his/her getting-off the vehicle.

In the vicinity of the unlocking operation detecting portion 31 at the inner side of the door-handle 2, there is provided the first light emitting portion 41 of the light emitting device 4 for emitting light beam toward the door panel 60 via the space between the door-handle 2 and the door panel 60. Due to the fact that the space defined between the door-handle 2 and the door panel 6 is used as a target, when the user is willing to grasp the door-handle 2, illuminating the space makes it possible to easily to the door-handle 2 for the user.

At the outer portion of the door handle 2, the second light emitting portion 42 of the light emitting device 4 from which light beam is emitted in the outward direction is arranged to surround the locking operation detecting portion 32. When the light beam is emitted from the second light emitting portion 42, the resulting illumination which acts as a luminous decoration enables the user to recognize preciously the position of the locking operation detecting portion 32. If the user touches the locking operation detecting portion 32 with one or more his/her fingers, the resulting conceal of the second light emitting portion 42 is limited to partial due to the circumferential or surrounding arrangement of the second light emitting portion 42. Thus, even the user's touch of the locking operation detecting portion 32, the second light emitting portion 42 remain visible from the outside of the door-handle 2. As to the arrangement of the second light emitting portion 42, instead of the endless surrounding mode as shown in FIG. 3, a discrete arrangement is available. In brief, so long as the clear view or indication of the position of the locking operation detecting portion 32, the arrangement of the second light emitting portion 42 is not restricted to that shown in FIG. 2.

Figure 4:
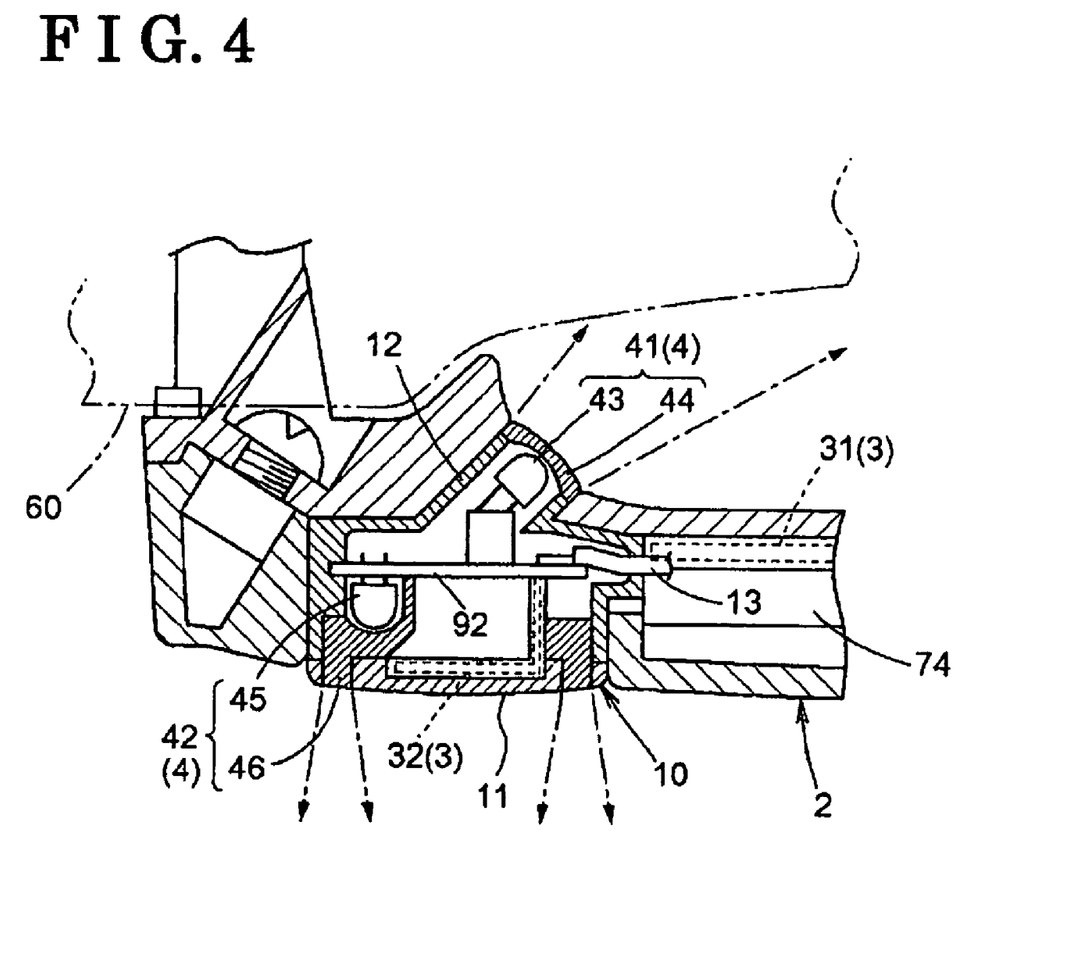
FIG. 4 is a partial cross-sectional view of a door handle in which light emitting and operation condition detection devices are provided.

As best shown in FIGS. 3 and 4, in the present embodiment, the locking operation detecting portion 32, the first light emitting portion 41, and the second light emitting portion 42 are integrated to a switch module 10. As the locking operation detecting portion 32, a human detection sensor of electrostatic capacitance detection type is used. The first light emitting portion 41 includes an LED (light emitting diode) 43 and a diffusion member 46 formed of a synthetic resin having light diffusion characteristics and is placed in a position of the door-handle 2 to emit a light beam toward the door panel 60 via the space between the door-handle 2 and the door panel 60. The diffusion member 46 is arranged to surround the locking operation detecting portion 32. Instead of the separate LED 43 and diffusion member 46, the LED 43 and the diffusion member 46 of light diffusion characteristics can be integrated into an LED module.

As shown in FIG. 4, the LED 43 of the first light emitting portion 41 and the LED 45 of the second light emitting portion 42 are mounted on one side (inner side) and the other side (outer side) of a base plate or substrate 92, respectively. The human detection sensor or locking operation detecting portion 32 is also connected to the substrate 92. The substrate 92 is held within a casing 12 which is provided at its inner end with the diffusion member 44 for the light diffusion of light emitted from the LED 43. An outer end of the casing 12 is fitted therein with a cover member 11 in fluid-tight fashion in which is placed the diffusion member 46 for the light diffusion of light emitted from the LED 45. It is possible to establish an electrical connection between the locking operation detecting portion 32 and the substrate 92 after placing the locking operation detecting portion 32 in the inner portion of the cover member 11. A cable 13 is extended from the substrate 92 to establish an electrical connection, via the wire harness 91, between the outer-vehicle-compartment driver 9 and each of the on-substrate first light emitting portion 41, second light emitting portion 42, and the locking operation detecting portion 32. It is to be noted that passing the cable 13 through the casing 12 is made in fluid-tight mode by sealing. An interface between the casing 12 and the cover member 11 is brought into fluid-tight state, which results from the snugly fitting of the cover member 11 into the outer end of the casing 12. Thus, as a whole, the switch module 10 is made enclosure of fluid-tight.

Thus fluid-tight construction of the switch module 10 makes it possible to increase or enhance each of the locking operation detecting portion 32 and the light emitting device 4 in durability and reliability. The integrated structure of the locking operation detecting portion 32 and the light emitting device 4 into the switch module 10 makes it possible to replace the switch module 10 with a new one easily preferably without lowering any one of locking operation detecting, light emitting, and illuminating functions.

As the locking operation detecting portion 32, instead of the human detecting sensor of electrostatic capacitor type, for example, a mechanical key cylinder mechanism is available.

[Signal Processing]

Figure 5:
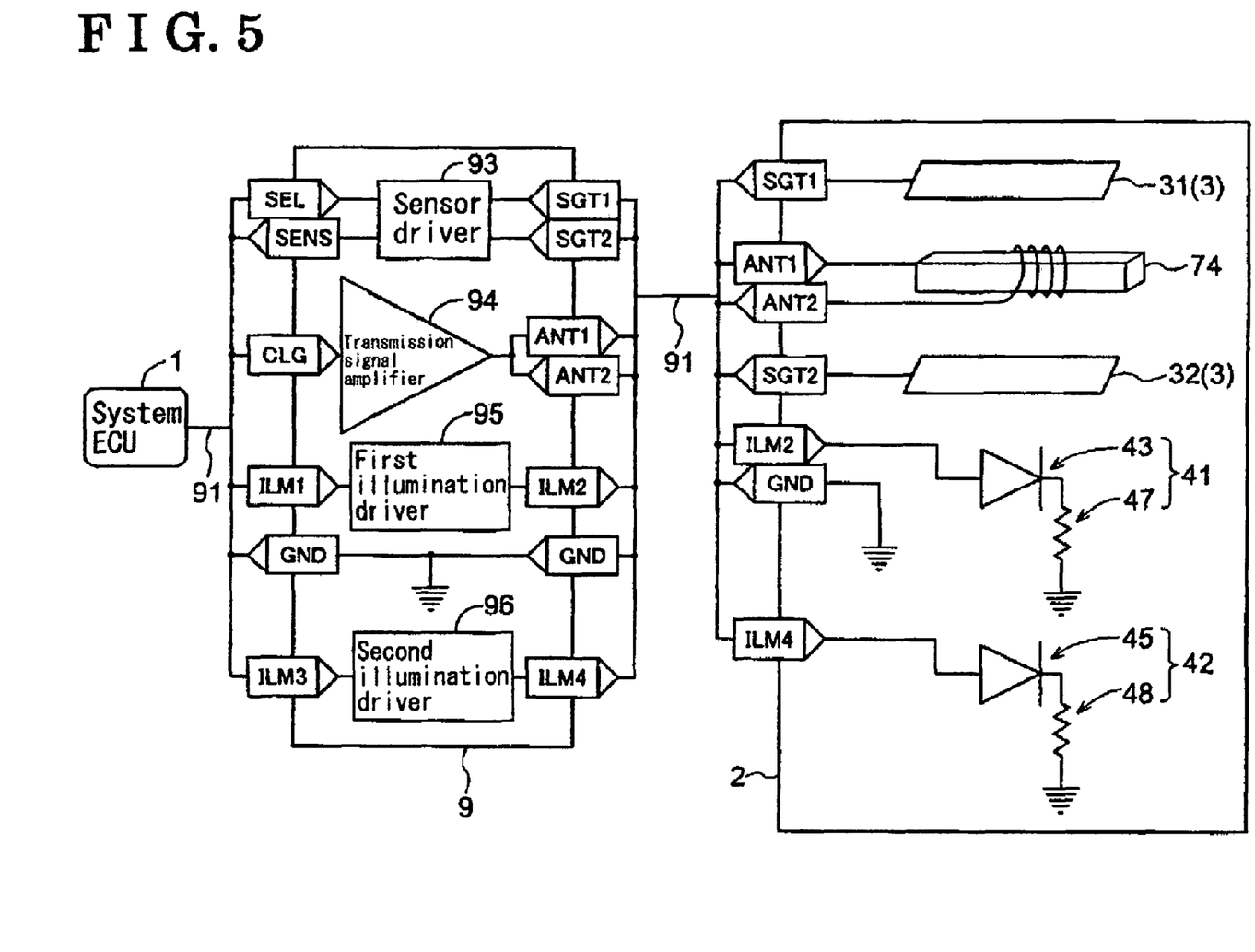
FIG. 5 is a circuit diagram of a signal processing portion of the control system of an opening/closing apparatus.

With reference to FIG. 5, hereinafter, detailed explanation is made as to how signals are processed in the smart system as an embodiment of the present invention. The outer-vehicle-compartment driver 9 includes a sensor driver 93 for driving the human detecting sensors 31 and 32 of the operating detecting device 3, a transmission signal amplifier 94 for transmitting signals to the mobile system or portable device 5, a first illumination driver 95 for controlling the first light emitting portion 41, and the a second illumination driver 96 for controlling the second light emitting portion 42.

When the system ECU 1 issues a request signal, the request signal is fed, via a terminal CLG, to the transmission signal amplifier 94 to modulate and amplifier the same. The resulting signal is fed, via terminals ANT1 and ANT2, to the outer-vehicle transmission antenna 74 housed in the door-handle 2 and is transmitted, as an electromagnetic wave, outside the vehicle V.

Signals from the unlocking operation detecting portion 31 and the locking operation detecting portion 32 are fed, via respective terminals SGT1 and SGt2, to the sensor driver 93. When the system ECU 1 requires to recognize the user's door unlocking intension, the system ECU 1 controls, via a terminal-SEL in order that the unlocking signal from the unlocking operation detecting portion 31 is fed to the system ECU 1 by way of the terminal SGT1, the sensor driver 93, and a terminal SENS. When the system ECU 1 requires to recognize the user's door locking intension, the system ECU 1 controls, via the terminal SENS in order that the locking signal from the locking operation detecting portion 32 is fed to the system ECU 1 by way of the terminal SGT2, the sensor driver 93, and the terminal SENS. Thus, the operation detecting signal selected depend on the signal inputted to the terminal SEL is fed, via the terminal SENS, to the system ECU 1.

The system ECU 1 controls the light emitting device 4 depending on whether the door 6 is in locked condition or unlocked condition. The system ECU 1 controls the first illumination driver 95 and the second illumination driver 96 via respective terminals ILM1 and ILM3 to driving signals, which cause, via respective terminals ILM2 and ILM4, the respective first and second light emitting portions 41 and 42 to emit light beams, respectively. The first light emitting portion 41 includes the LED 43 and a resistor 47 for regulating a current passing through the LED 43. Likewise, the second light emitting portion 42 includes the LED 45 and a resistor 48 for regulating a current passing through the LED 45.

It is to be noted that controlling the light emitting device 4 includes, say, controlling the LED to turn on or off, controlling the LED to remain its turned-on state, and controlling the LED to blink or flicker. If each of the LED 43 and the LED 45 is capable of emitting plural colored light beams, a control for selecting the color of the emitted light beam is available.

[Unlocking-Door Operation]

Figure 6:
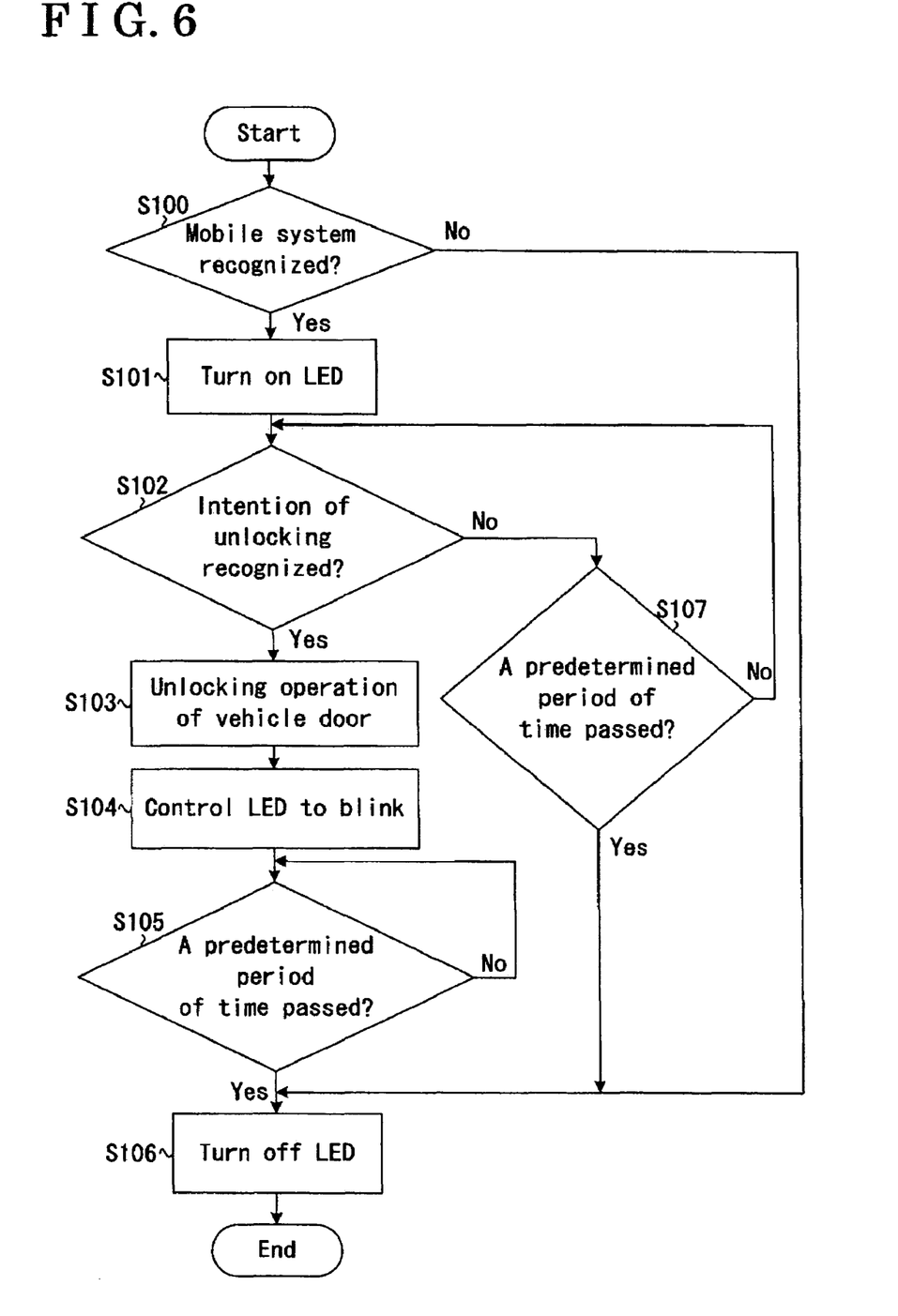
FIG. 6 is a flowchart showing how an unlocking operation of the control system of an opening/closing apparatus is performed.

Next, with reference to FIG. 6, how the door unlocking-door operation is performed is explained.

While the vehicle V is parking with its doors locked, to check the mobile system 5 for its proper or registered electronic key, the system ECU 1 issues the request signal to the outer-vehicle-compartment driver 9 that is provided in the door panel 60 of the vehicle door 6. The transmission signal amplifier 94 in the driver 9 modulates and amplifies the request signal. The resulting signal is emitted outside the vehicle V as an electromagnetic wave from the antenna 74. At this stage, if the mobile system 5 approaches the vehicle V, the emitted electromagnetic wave is received by the receiving system 52 of the mobile system 5. In the mobile system 5, the resulting signal is processed at the signal processing CPU 51. The mobile system 5, via the transmission system 53, transmits return information including, for example, property of the received signal and a registered number assigned to the mobile system 5. The property is information indicating a source of the received signal and other items. The transmitted return information is received at the turner 71. The system ECU 1 checks the property and the registered number to recognize whether or not the approaching mobile system 5 is qualified as the electronic key of the vehicle V (S100).

As soon as the qualification of the approaching mobile system 5 as the electronic key of the vehicle is proved the smart entry system is transferred in its unlocking detecting mode. For indicating the user such a transfer to unlocking detecting mode, the system ECU 1 drives the first light emitting portion 41 to emit light beam. That is, the system ECU 1 orders the first illumination driver 96 of the outer-vehicle-compartment driver 9 to turn on the LED 43 of the first light emitting portion 43 (S101). Further, the system ECU 1 controls, by way of the terminal SEL, sensor driver 93 of the outer-vehicle-compartment 9 to check for an input of the detected signal from the unlocking operation detecting portion 32 for a predetermined time duration (S102 and S107). Upon elapse of the predetermined time duration, if no detection signal has been fed from the unlocking operation detecting portion 31, by way of the terminal SENS, to the system ECU 1, the system ECU 1 terminates the routine after turning off the LED 43 (S106).

Before elapse of the predetermined time duration, if the detection signal is inputted to the system ECU 1 from the unlocking operation detecting portion 31, the system ECU 1 issues an order to unlock the vehicle door 6 to the door ECU 61, then the door actuator 62 is driven to unlock the vehicle door 6 (S103). When the vehicle door 6 is brought into its unlocked condition, the system ECU 1 causes the LED 43 to turn on intermittently or blink (S104) for a predetermined time duration in order to inform the user that the vehicle door 6 has been unlocked. When the predetermined time duration elapses (S105), the system ECU 1 terminates the routine after turning off the LED 43 (S106).

Any pattern mode of blinking the LED 43 is available so long as the use can recognize it. Instead of turning-on and blinking the LED 43 for distinguishing locking and unlocking conditions of the vehicle door 6, making the LED 43 to emit light beams depending on whether the vehicle door 6 is in locked condition or unlocked condition. Of course, it is possible to turn on and blink the LED 43 for distinguishing unlocking and locking conditions of the vehicle door 6. In addition, changing the color of emitted light is available by the combination of turning-on and blinking the LED 43 for distinguishing locking and unlocking conditions of the vehicle door 6.

As, described above, when the user having the mobile system 5 approaches the vehicle V to grasp the door handle 2 for opening the vehicle door 6, the vehicle door 6 can be unlocked successfully. In addition, the smart system is capable of providing clear views of that which the vehicle door 6 is ready for being unlocked condition by, say, illuminating the LED 43 and that which the vehicle door 6 has been unlocked by blocking the LED 43, resulting in that the smart system is made excellence or boosted in convenience. Furthermore, when the user is difficult to recognize the correct position of the door handle 2 in dark environment such as night, the present embodiment provides the illumination of the space defined between the door handle 2 and the vehicle door 6, which makes it possible for the user to gasp surely the door handle 2. Thus, the user's intension can be recognized correctly by the unlocking operation detecting portion 31 provided in the door handle 6, which cause the smart system to operate smoothly, resulting in that the smart system becomes user-friendly or easy-to-handle.

[Locking Operation]

Figure 7:
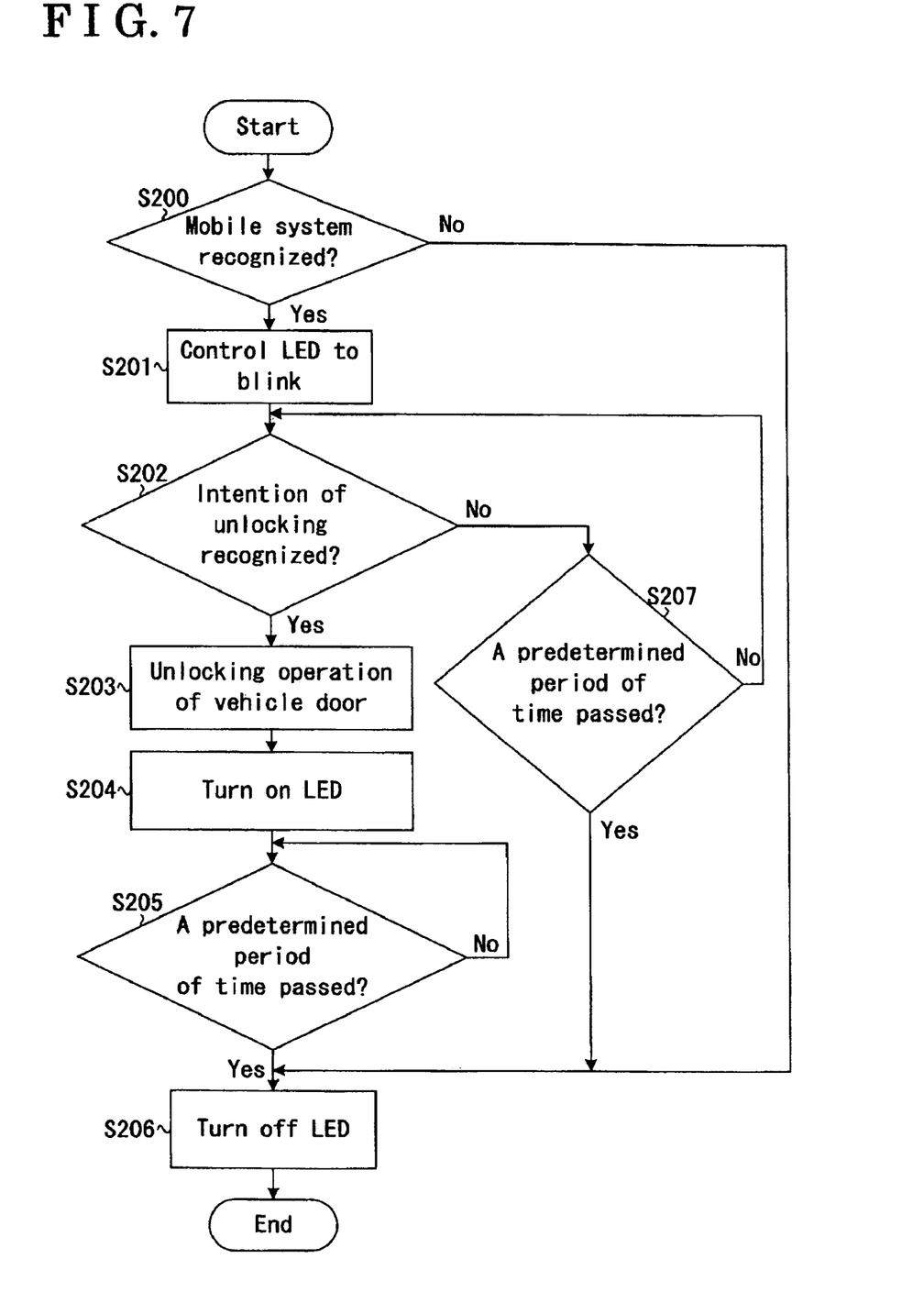
FIG. 7 is a flowchart showing how a locking operation of the control system of an opening/closing apparatus is performed.

Next, with reference to FIG. 7, a detailed explanation will be made as to how the locking operation is performed when the user has an intension to get off the vehicle V. When the user is in the vehicle compartment, the mobile system or portable device 5 as an electronic key that is possessed or held by the user is also in the vehicle compartment. The mobile system 5 receives the request signal that is modulated and amplified at the in-vehicle-compartment driver 72 after being transmitted from the in-vehicle-compartment antenna 73. The mobile system 5 orders the CPU 51 to manipulate the received signal to create the return information including received signal characteristic and registered code and orders the transmission system 53 to the return information as electromagnetic wave. The resulting signal electromagnetic wave is received at the turner 71 and the system ECU 1 confirms the return information to recognize that the mobile system 5 is in the vehicle compartment.

Under such conditions, when the vehicle door 6 is closed after that the user gets off the vehicle V with his/her mobile system 5, the system ECU 1 recognizes that the resulting interruption of the communication described the preceding paragraph and subsequent transfer of the mobile system 5 from the in-vehicle-compartment to the outside-vehicle-compartment (S200). In addition to this process or cumulatively, it is possible to establish communication between the mobile system 5 and the signal transmitted from the out-vehicle-compartment antenna 74 as described in the unlocking operation.

Upon reorganizations of the user's getting-off the vehicle V and subsequent closure of the vehicle door 6, the smart entry system goes to its locking detection mode. For notifying the user such a transfer to the lock detection mode, the system ECU 1 drives the second illuminating portion 42 to illuminate. In detail, the smart entry system orders the outer-vehicle-compartment driver 9 to illuminate intermittently or blink the LED 45 of the second light-emitting portion 45 (S201). Any blinking mode of the LED 456 is available so long as it is able to recognize for the user. Furthermore, the system ECU 1 controls, via the terminal SEL, the sensor driver 93 of the outer-vehicle-compartment driver 9 to check for an input of the detection signal from the locking operation detection portion 32 for a predetermined time duration (S202 and S207). Unless the detecting signal is fed from the locking operation detecting portion 32, via the terminal SENS, to the system ECU 1 even after elapse of the predetermined time duration, the LED 45 is turned off (S206) to terminate the routine.

Before elapse of the predetermined time duration, upon receipt of the detection signal from the locking operation detecting portion 32, the system ECU 1 orders the door ECU 6 to drive the door actuator 62 for locking the vehicle door 6 (S203). After completion of closing the vehicle door 6, the system ECU 1 causes the LED 43 to illuminate (S204) to notify the user that the vehicle door 6 has been brought into its locked condition. After continual illumination of the LED 45 for a predetermined time duration (206), the LED 45 is turned off (S206) to terminate the door locking operation.

Instead of turning-on and blinking the LED 43 for distinguishing locking and unlocking conditions of the vehicle door 6, making the LED 43 to emit light beams depending on whether the vehicle door 6 is in locked condition or unlocked condition. Of course, it is possible to turn on and blink the LED 43 for distinguishing unlocking and locking conditions of the vehicle door 6. In addition, changing the color of emitted light is available by the combination of turning-on and blinking the LED 43 for distinguishing locking and unlocking conditions of the vehicle door 6.

Thus, the possibility of detecting the locked condition of the vehicle door 6 and the locked condition of the vehicle door 6 can be notified clearly or distinctively by, say, blinking the LED 45 and illuminating the LED 45, respectively, resulting in that the smart entry system is made excellent in convenience or practical performance. In addition, in dark environment such as night, even unclear view of the position of the locking operation detecting portion 32 of the door handle 2 fixedly mounted on the outer surface of the vehicle door 6, in the present embodiment, providing the light emitting device 42 and diffusion member 46 around the diffusion member 46 makes it possible to minimize the concealed area of the locking operation detecting portion 32 upon manipulation thereof by the user's fingers, thereby ensuring the user to operate correctly or smoothly the locking operation detecting portion 32. Thus, the locking operation detecting portion 32 is capable of recognizing or understanding the user's intension to lock the vehicle door 6 without difficulty, which results in smooth operation of the smart entry system, thereby boosting the user's practical performance.

The principles, preferred embodiment and mode of operation of the present invention have been described in the foregoing specification. However, the invention which is intended to be protected is note to be construed as limited to the particular embodiments disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An opening/closing apparatus for a vehicle door comprising:
    a door handle secured to an outer surface of the vehicle door, the door handle being manipulated by a user for opening and closing the vehicle door;
    an unlocking condition detecting portion for checking whether or not the door handle is manipulated by the user to open the vehicle door, the unlocking condition detecting portion being provided in the door handle so as to be opposite to the outer surface of the vehicle door;
    a first light-emitting portion provided in the door handle and emitting a light beam to the outer surface of the vehicle door so as to illuminate a space defined between the door handle and the outer surface of the vehicle door; and
    a controller establishing a wireless communication with a mobile system held by the user to recognize the user, the controller causing the first light-emitting portion to emit the light beam when the user is recognized to be in approaching the vehicle, the controller bringing the vehicle door from its locked condition to unlocked condition when the unlocking condition detecting portion is indicative of the user's manipulation of the door handle to open the vehicle door.

2. An opening/closing apparatus as set forth in claim 1 further comprising:
    a locking operation detecting portion for checking whether or not the door handle is manipulated by the user to close the vehicle door, the locking operation detecting portion being provided in the door handle so as to be oriented away from the outer surface of the vehicle door; and
    a second light-emitting portion provided in the door handle in order to emit a light beam away from the outer surface of the vehicle door,
    wherein the controller establishes a wireless communication with the mobile system held by the user to recognize the user, the controller bringing the vehicle door from its unlocked condition to locked condition when the locking condition detecting portion is indicative of the user's manipulation of the door handle to close the vehicle door, the controller causing the second light-emitting portion to emit the light beam when the user is recognized to be outside the vehicle.

3. An opening/closing apparatus as set forth in claim 2, wherein the locking operation detecting portion, the first light-emitting portion, and the second light-emitting portion are integrated into a switching module.

4. An opening/closing apparatus as set forth in claim 3, wherein the switching module is formed into a sealed structure for fluid-tight.

5. An opening/closing apparatus as set forth in claim 2, wherein the locking operation detecting portion is in the form of a human detection sensor of electrostatic capacitor type.

6. An opening/closing apparatus as set forth in claim 2, wherein the second light-emitting portion is located for user's easy recognition of the locking operation detecting portion.

7. An opening/closing apparatus as set forth in claim 6, wherein the second light-emitting portion is so located as to surround the locking operation detecting portion.

8. An opening/closing apparatus for a vehicle door comprising:
    a door handle secured to an outer surface of the vehicle door, the door handle being manipulated by a user for opening and closing the vehicle door;
    an operation detecting portion for checking whether the door handle is manipulated to open or close the vehicle door, the operation detecting portion being provided in the door handle;
    a controller establishing locking and unlocking conditions of the vehicle door on the basis of user's intentions; and
    a light emitting device provided in the door handle, the light emitting device being driven by the controller to emit light beams to and away from the outer surface of the vehicle door depending on the respective conditions of the vehicle door.

9. An opening/closing apparatus as set forth in claim 8, wherein the controller includes a recognizing portion that is in communication with a mobile system held by the user for an recognition thereof, the controller recognizes the user's intention to unlock the vehicle door on the basis of a detected condition of the operation detecting portion when the recognizing portion recognize that the mobile system approaches the vehicle, while the controller recognizes the user's intention to lock the vehicle door on the basis of another detected condition of the operation detecting portion when the recognizing portion recognize that the mobile system has moved outside the vehicle.

10. An opening/closing apparatus as set forth in claim 8, wherein the operation detecting portion includes at least an unlocking operation detecting portion and a locking operation detecting portion, the unlocking operation detecting portion being operated to detect the user's manipulation of the door handle with his/her intention to unlock the vehicle door, the locking operation detecting portion being operated to detect the user's manipulation of the door handle with his/her intention to lock the vehicle door, the unlocking operation detecting portion and the locking operation detecting portion are provided in the door handle so as to be opposite to and oriented away from the outer surface of the vehicle door, respectively.

11. An opening/closing apparatus as set forth in claim 10, wherein the controller, when recognizes that the mobile system approaches and moves outside the vehicle, drives the light-emitting device to emit light beams away from and to the outer surface of the vehicle door, respectively.

12. An opening/closing apparatus as set forth in claim 11, wherein the controller drives the light-emitting device to emit the light beam in one of continual and intermittent modes when the controller detects that the vehicle door is unlocked or recognizes that the mobile system approaches the vehicle, while the controller drives the light-emitting device to emit the light beam in the other of continual and intermittent modes when the controller detects that the vehicle door is locked or recognizes that the mobile system is outside the vehicle.

13. An opening/closing apparatus as set forth in claim 8, wherein the operation detecting portion includes a sensor electrode to detect a body of the user, thereby detecting the manipulated condition of the door handle.

14. An opening/closing apparatus as set forth in claim 8, wherein the operation detecting portion includes a switch, thereby detecting the manipulated condition of the door handle.

15. An opening/closing apparatus as set forth in claim 10, wherein the operation detecting portion and the light-emitting device are integrated into a switching module.

16. An opening/closing apparatus as set forth in claim 15, wherein the switching module is formed into a sealed structure for fluid-tight.

17. An opening/closing apparatus as set forth in claim 10, wherein the light-emitting device is located for user's easy recognition of the locking operation detecting portion.

* * * * *